United States Patent
Hirai

(10) Patent No.: US 8,160,658 B2
(45) Date of Patent: Apr. 17, 2012

(54) CELLULAR PHONE

(75) Inventor: Yuu Hirai, Osaka (JP)

(73) Assignee: KYOCERA Corporation, Kyoto (JP)

( * ) Notice: Subject to any disclaimer, the term of this patent is extended or adjusted under 35 U.S.C. 154(b) by 263 days.

(21) Appl. No.: 12/446,739

(22) PCT Filed: Oct. 26, 2007

(86) PCT No.: PCT/JP2007/070889
§ 371 (c)(1),
(2), (4) Date: Apr. 22, 2009

(87) PCT Pub. No.: WO2008/050854
PCT Pub. Date: May 2, 2008

(65) Prior Publication Data
US 2009/0270146 A1    Oct. 29, 2009

(30) Foreign Application Priority Data
Oct. 26, 2006    (JP) .................................. 2006-291723

(51) Int. Cl.
*H04M 1/00*    (2006.01)
(52) U.S. Cl. ............... 455/575.3; 455/575.5; 455/575.6; 455/575.7
(58) Field of Classification Search ............... 455/575.1, 455/574, 575.7, 575.3, 575.5, 575.6
See application file for complete search history.

(56) References Cited

U.S. PATENT DOCUMENTS

| | | | |
|---|---|---|---|
| 6,459,887 B2 | 10/2002 | Okuda | |
| 6,781,556 B2 | 8/2004 | Kojima et al. | |
| 6,861,989 B2 * | 3/2005 | Morningstar et al. | ........ 343/702 |
| 7,002,521 B2 | 2/2006 | Egawa et al. | |
| 7,046,204 B2 | 5/2006 | Satoh et al. | |
| 7,158,083 B2 | 1/2007 | Satoh et al. | |
| 7,173,568 B2 * | 2/2007 | Kanazawa | .................... 343/702 |
| 7,343,183 B2 | 3/2008 | Iguchi | |
| 7,443,349 B2 | 10/2008 | Harano | |
| 2004/0222926 A1 * | 11/2004 | Kontogeorgakis et al. | ... 343/702 |
| 2005/0059444 A1 * | 3/2005 | Martinez et al. | ........... 455/575.7 |

FOREIGN PATENT DOCUMENTS

| | | |
|---|---|---|
| EP | 1619749 A1 | 1/2006 |
| JP | 0927711 | 1/1997 |
| JP | 09321529 | 12/1997 |

(Continued)

OTHER PUBLICATIONS

Office Action dated Aug. 17, 2011, issued for counterpart Chinese Patent Application No. 200780039370.4.

*Primary Examiner* — Dwayne Bost
*Assistant Examiner* — Inder Mehra
(74) *Attorney, Agent, or Firm* — Procopio, Cory, Hargreaves & Savitch LLP

(57) ABSTRACT

To aim to provide a mobile telephone capable of reducing a physical space necessary for providing a reflector compared with that in conventional mobile telephones, and reducing the SAR by securing a distance between an antenna and a passive element operating as a reflector. A cabinet of a top housing 2 includes a passive element 22 in an overlap region overlapping between the top housing 2 and the bottom housing 3 in an unfolded state, and the bottom housing includes an antenna in the overlap region. This can suppress the thickness of the mobile telephone in a folded state and secure a distance between the antenna 31 and the passive element 22 operating as a reflector.

9 Claims, 5 Drawing Sheets

FOREIGN PATENT DOCUMENTS

| | | |
|---|---|---|
| JP | 11312998 | 9/1999 |
| JP | 2001251399 | 9/2001 |
| JP | 2003110329 | 1/2003 |
| JP | 2003258523 | 9/2003 |
| JP | 2004128660 | 4/2004 |
| JP | 2004134975 | 4/2004 |
| JP | 2004134976 | 4/2004 |
| JP | 2004282216 | 10/2004 |
| JP | 2005318566 | 10/2005 |
| JP | 200633312 | 2/2006 |
| JP | 200650496 | 2/2006 |
| WO | WO2006082918 | 8/2006 |

* cited by examiner

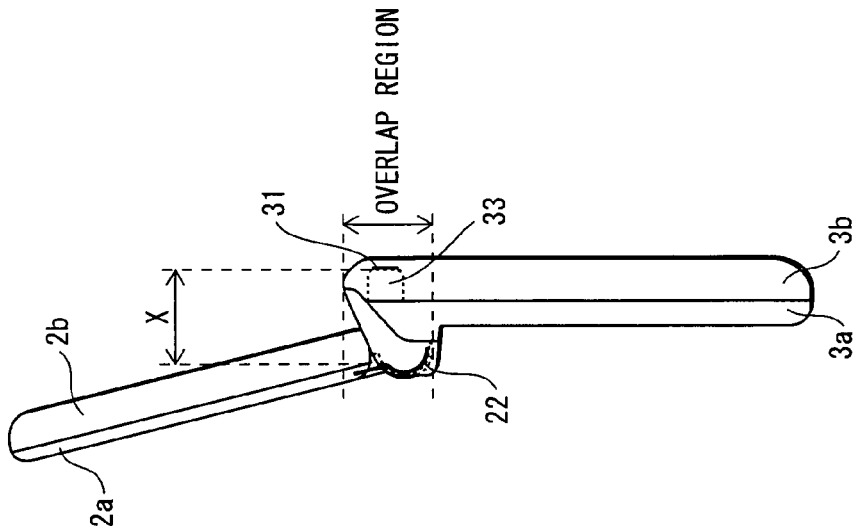
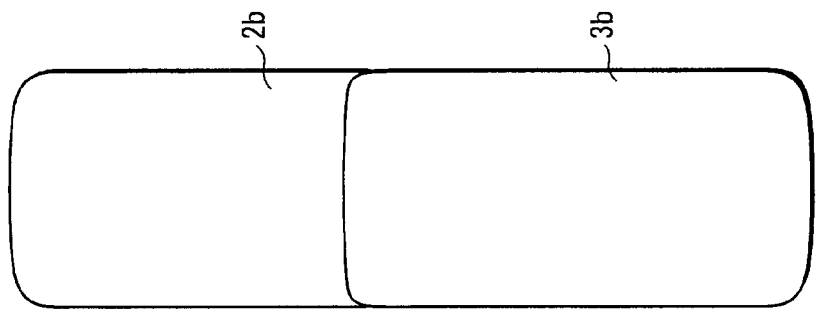
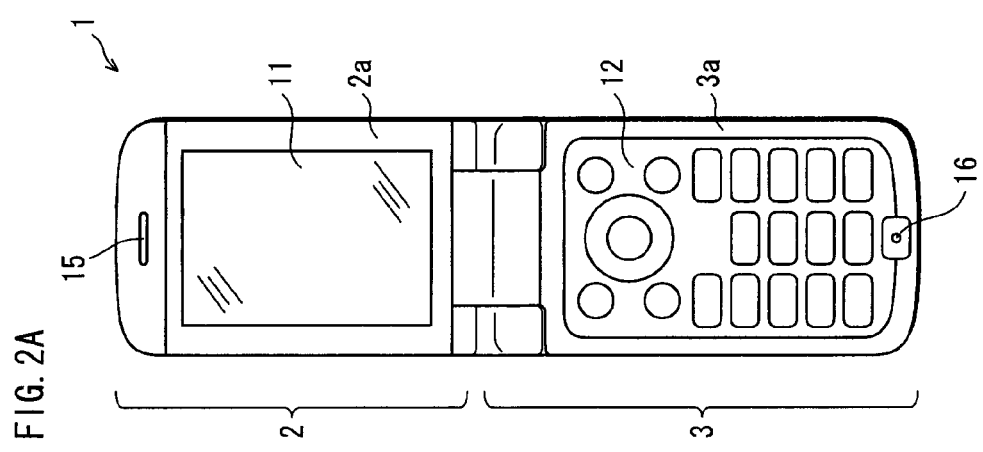

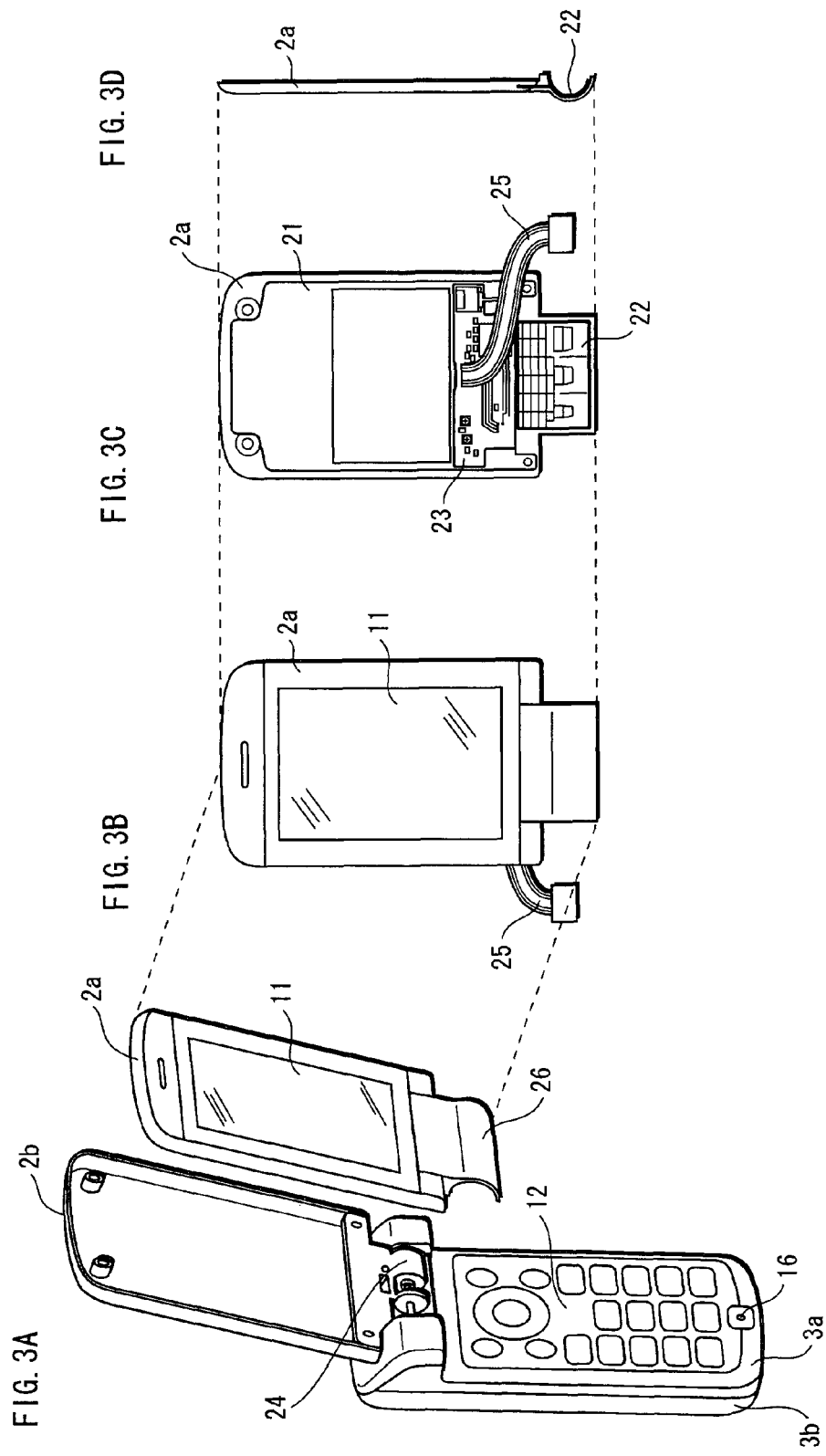

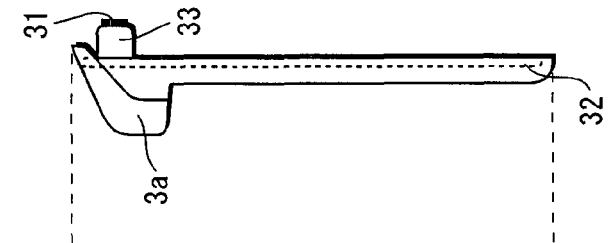
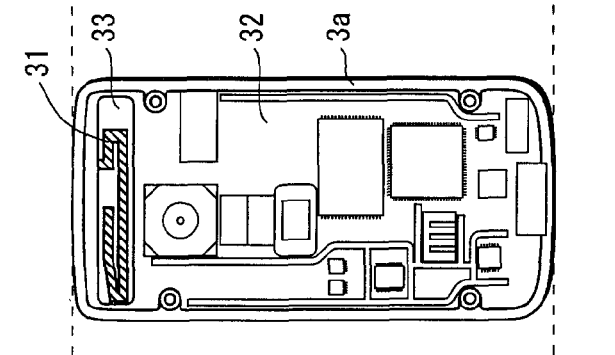
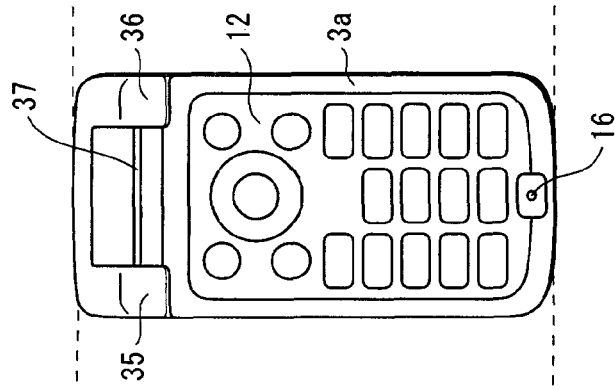
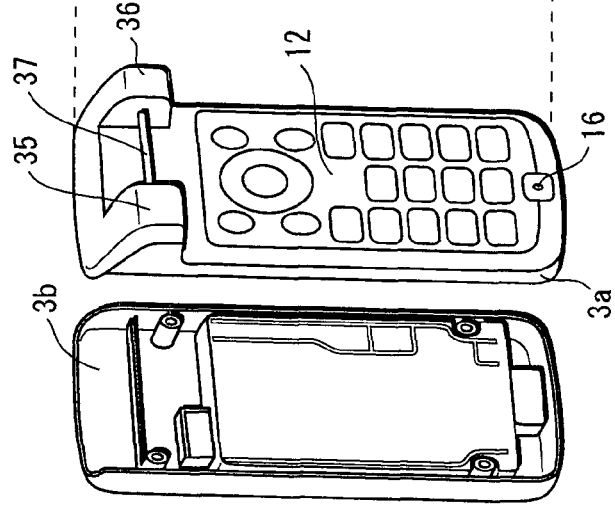

CELLULAR PHONE

TECHNICAL FIELD

The present invention relates to a mobile telephone, and particularly to an art of improving a gain of an antenna and reducing the influence of electric waves on the human body.

BACKGROUND ART

In recent, years, the reduction in size and thickness of mobile telephones has been promoted. With this, antennas have been reduced in size, and a distance between a mobile telephone and the human body, particularly head, during a call has been reduced more.

The size reduction of antennas causes the decrease of the gain thereof. Also, the reduction of the distance between the mobile telephone and the human body during a call increases the Specific Absorption Rate (SAR) of electric waves in the human body. Therefore, in order to further promote the reduction in size and thickness of mobile telephones, it is necessary to improve the gain of the antennas and reduce the SAR.

According to the art disclosed in the Patent Document 1 aiming to solve the above problem, a passive element is provided in the vicinity of an antenna element, and substantially parallel to a width direction of a ground plane so as to be adjacent to the ground plane. When the passive element is located on a side closer to the human body relative to the ground plane during a call, the gain during the call is improved by causing the passive element to have a length so as to operate as a director. When the passive element is located on a side opposite to the human body relative to the ground plane during a call, the SAR is reduced by causing the passive element to have a length so as to operate as a reflector.

Patent Document 1: Japanese Laid-Open Patent Application Publication No. 2003-258523

DISCLOSURE OF THE INVENTION

Problems the Invention is Going to Solve

However, the mobile telephone disclosed in the Patent Document 1 is a so-called straight type mobile telephone. In the case where the reflector is located between the built-in antenna and the human body in order to reduce the SAR of the electric waves in the human body during a call, and also the distance between the built-in antenna and the reflector is secured in order to cause the reflector to effectively operate, the thickness of the housing is increased.

In the case where this art is applied to a foldable mobile telephone composed of a first housing having a display unit on a main surface thereof and a second housing having an operation unit on a main surface thereof that are connected to each other in a foldable manner, one of the first housing and the second housing that includes a built-in antenna and an operation unit is increased in thickness. As a result, the mobile telephone in the folded state is increased in thickness compared with conventional mobile telephones.

In view of the above problem, the present invention aims to provide a mobile telephone capable of reducing a physical space necessary for providing a reflector compared with that in conventional mobile telephones, and reducing the SAR by securing an enough distance between the antenna and the passive element operating as a reflector.

Means to Solve the Problems

In order to solve the above problem, the present invention provides a foldable mobile telephone that comprises a first housing and a second housing connected to each other, wherein the first housing and the second housing have an overlap region that is a region overlapping therebetween in an unfolded state, within the overlap region, the first housing is more distant from a user's body than the second housing, in a positional relation with the user holding the telephone during a telephone call, the first housing includes a built-in antenna in the overlap region, and the second housing includes a passive element in the overlap region, and the passive element influences on characteristics of electric waves in a relation with the built-in antenna.

Effect of the Invention

According to the mobile telephone of the present invention having the above structure, the first housing includes the antenna in the overlap region between the first housing and the second housing in the unfolded state, the second housing includes the passive element in the overlap region, and the passive element influences on characteristics of electric waves in a relation with the built-in antenna. As a result, it is possible to reduce a physical spade necessary for providing the passive element, and secure a distance between the antenna and the passive element operating as a reflector, and thereby to reduce the SAR. Also, it is possible to suppress the thickness of the mobile telephone in the folded state that is the same as that of conventional mobile telephones with no reflector.

BRIEF DESCRIPTION OF THE DRAWINGS

FIGS. 2A, 2B, and 2C are respectively a front view, a side view, and a back view showing the mobile telephone according to the embodiment of the present invention;

FIGS. 3A, 3B, 3C, and 3D are respectively a front view, a side view, and a back view showing a front cabinet provided in a top housing of the mobile telephone;

FIGS. 4A, 4B, 4C, and 4D are respectively a front view, a side view, and a back view showing a front cabinet provided in a bottom housing of the mobile telephone.

DESCRIPTION OF CHARACTERS

Figure 1A:
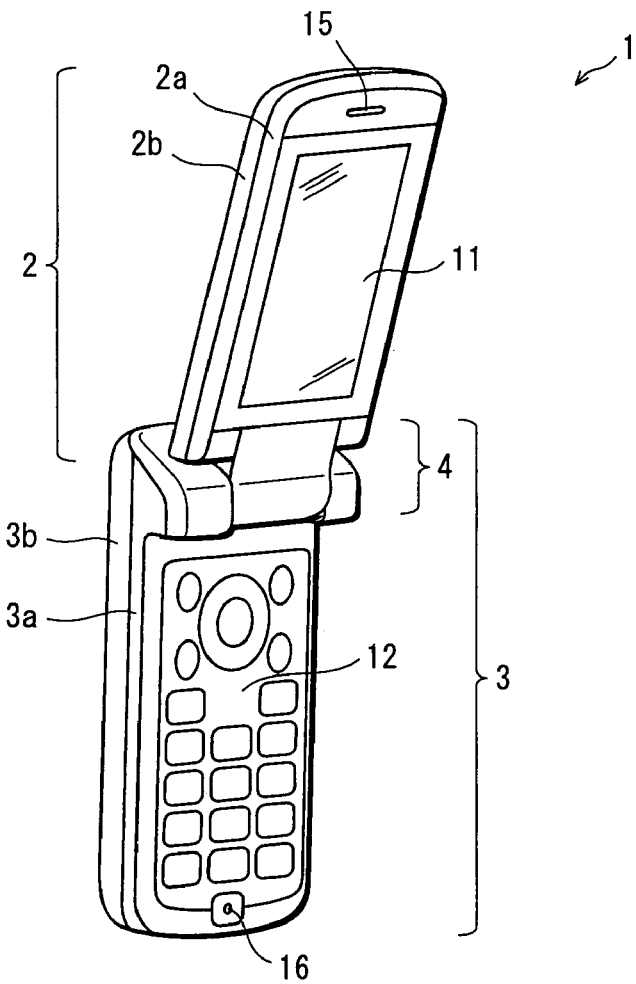
FIGS. 1A and 1B are external views respectively showing a mobile telephone according to an embodiment of the present invention when in an unfolded state and when in a folded state.

1: mobile telephone
2: top housing
2a: cabinet
2b: cabinet
3: bottom housing
3a: cabinet
3b: cabinet
11: display device
12: operation switch
15: speaker
16: microphone
21: metal member
22: passive element
24: bearing
25: connection wire
26: cylindrical part
31: antenna 32: control circuit
33: columnar member
35 and 36 projecting part
37: shaft

BEST MODE FOR CARRYING OUT THE INVENTION

A mobile telephone according to an embodiment of the present invention optimizes arrangement of an antenna and a reflector to improve a gain of the antenna, and reduce the influence of electric waves on the human body, compared with conventional arts.

The following describes the mobile telephone according to the embodiment of the present invention, with reference to the drawings.

Figure 1B:
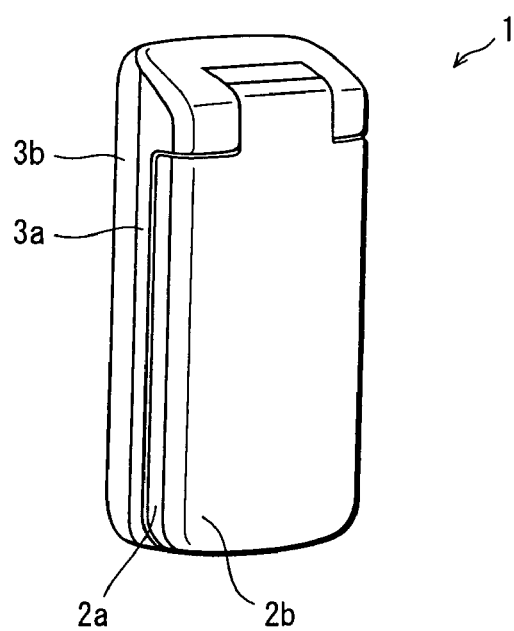

FIGS. 1A and 1B are external views showing a mobile telephone 1 according to an embodiment of the present invention.

FIG. 1A is an external view showing the mobile telephone 1 in a state where a housing is unfolded (unfolded state), and FIG. 1B is an external view showing the mobile telephone 1 in a state where the housing is folded (folded state).

The mobile telephone 1 is a foldable mobile telephone composed of a top housing 2 and a bottom housing 3 connected to each other via a hinge 4, as shown in FIG. 1A. The top housing 2 includes a display device 11 and a speaker 15. The bottom housing 3 includes an operation switch 12 for inputting telephone numbers and the like and a microphone 16.

As shown in FIGS. 1A and 1B, the top housing 2 is composed of a cabinet 2a as a front cover and a cabinet 2b as a back cover that are fit each other. Also, the bottom housing 3 is composed of a cabinet 3a as a front cover and a cabinet 3b as a back cover.

FIGS. 2A, 2B, and 2C are respectively a front view, a back view, and a side view showing the mobile telephone 1 when in the unfolded state.

As shown in FIG. 2C, the mobile telephone 1 is composed of the top housing 2 and the bottom housing 3 that are disposed so as to overlap each other. A region that overlaps between the top housing 2 and the bottom housing 3 is hereinafter referred to as an "overlap region", which is described later.

FIG. 3A shows the top housing 2. FIGS. 3B, 3C, and 3D are respectively a front view, a back view, and a side view showing the cabinet 2a of the top housing 2.

As shown in FIG. 3A, a bearing 24 is provided in the cabinet 2b so as to be connected to a shaft provided in the housing 3, which is described later.

As shown in FIG. 3C, a passive element 22 is evaporated onto the cabinet 2a. A metal member 21 is provided in the cabinet 2a so as not to contact with the passive element 22. The metal member 21 is used as an antenna for 800 MHz band. A substrate 23 is disposed on the metal member 21. A connection wire 25 is disposed on the substrate 23 so as to electrically connect an electrical line of the top housing 2 with an electrical line of the bottom housing 3. On a surface of the metal member 21 that is opposite to a surface on which the substrate 23 is disposed, a substrate on which the display device 11 and the speaker 15 are disposed is disposed. This substrate is electrically connected to the substrate 23.

FIG. 4A shows the bottom housing 3, and FIGS. 4B, 4C, and 4D are respectively a front view, a back view, and a side view of the cabinet 3a of the bottom housing 3.

As shown in FIG. 4A, the cabinet 3a has projecting parts 35 and 36 at a top edge thereof. Also, between the projecting parts 35 and 36, a shaft 37 is provided so as to be rotatably connected to the bearing 24. After assembling of the mobile telephone 1, the shaft 37 is rotatably connected to the bearing 24. Also, the top housing 2 has a cylindrical part 26 that covers the bearing 24 at a bottom edge thereof.

Here, the hinge 4 is a collective term of the projecting parts 35 and 36, the shaft 37, the bearing 24, and the cylindrical part 26.

Also, as shown in FIGS. 4B and 4C, an operation switch 12, a microphone 16, a columnar member 33 in which an antenna 31 is disposed, a control circuit 32, electrodes, and so on are mounted in a substrate of the cabinet 3a.

The control circuit 32 includes a high frequency circuit unit, a CPU, a memory, and so on. The high frequency circuit unit performs communication in 800 MHz band using the metal member 21 functioning as an antenna, and also performs communication in 1800 MHz band using the antenna 31.

The cabinet 3b is a back cover for protecting a surface of the substrate of the cabinet 3a on which the components are mounted.

Next, the structure of the overlap region that is the characteristic of the present invention is described. As described above, the mobile telephone 1 is composed of the top housing 2 and the bottom housing 3 that overlap each other. A region overlapping between the top housing 2 and the bottom housing 3 is the overlap region.

As shown in FIGS. 3C and 3D, in a portion of the cabinet 2a that is included in the overlap region, the passive element 22 that is an evaporated film is directly applied to a resin body of the cabinet 2a.

The passive element 22 is adjusted so as to have an electrical length that is approximately half a wavelength relating to communication using the antenna 31, and operates as a reflector for performing communication in 1800 MHz band.

The thickness of the overlap region of the mobile telephone 1 in the unfolded state is substantially equal to the total of the thickness of the top housing 2 and the thickness of the bottom housing 3, as shown in FIG. 2C. As described above, the passive element 22 is evaporated onto an inner surface of the cabinet 2a, and the antenna 31 is disposed in the columnar member 33 disposed in the cabinet 3b. Accordingly, the mobile telephone 1 according to the embodiment of the present invention is capable of securing a larger distance X between the passive element 22 and the antenna 31, compared with conventional arts.

Also, since the overlap region is provided, the influence of inclusion of the reflector on the thickness of the mobile telephone is virtually negligible even when in the folded state. As a result, it is possible to suppress the thickness of the mobile telephone.

Here, the passive element 22 is evaporated onto only the overlap region. This is because it is undesirable that if the evaporated film as a passive element is applied to substantially the entire inner surface of the cabinet 2a, the antenna characteristics of communication in 800 MHz using the metal member 21 as an antenna are deteriorated, and as a result the communication efficiency is deteriorated. This is undesirable.

Also, in order to use the passive element 22 as a reflector for 1800 MHz band, it is important not to electrically connect the passive element 22 with the metal member 21 (earth). This is because if the passive element 22 is connected to the metal member 21 in the top housing 2, the metal member 21 does not operate as an antenna for 800 MHz band. Furthermore, the passive element 22 is disposed only inside of the cabinet 2a. Accordingly, after assembling of the mobile telephone 1, the passive element 22 is not exposed outside of the housing.

Therefore, this disposition of the passive element 22 does not spoil the external appearance of the mobile telephone 1.

As described above, when a user has a telephone conversation using the speaker 15 and the microphone 16 of the mobile telephone 1 in the unfolded state, the passive element 22 is able to effectively operate as a reflector. This can reduce the SAR. Also, it is possible to suppress the thickness of the foldable mobile telephone 1 in the folded state so as to be the same as that of conventional mobile telephones.

Figure 5:
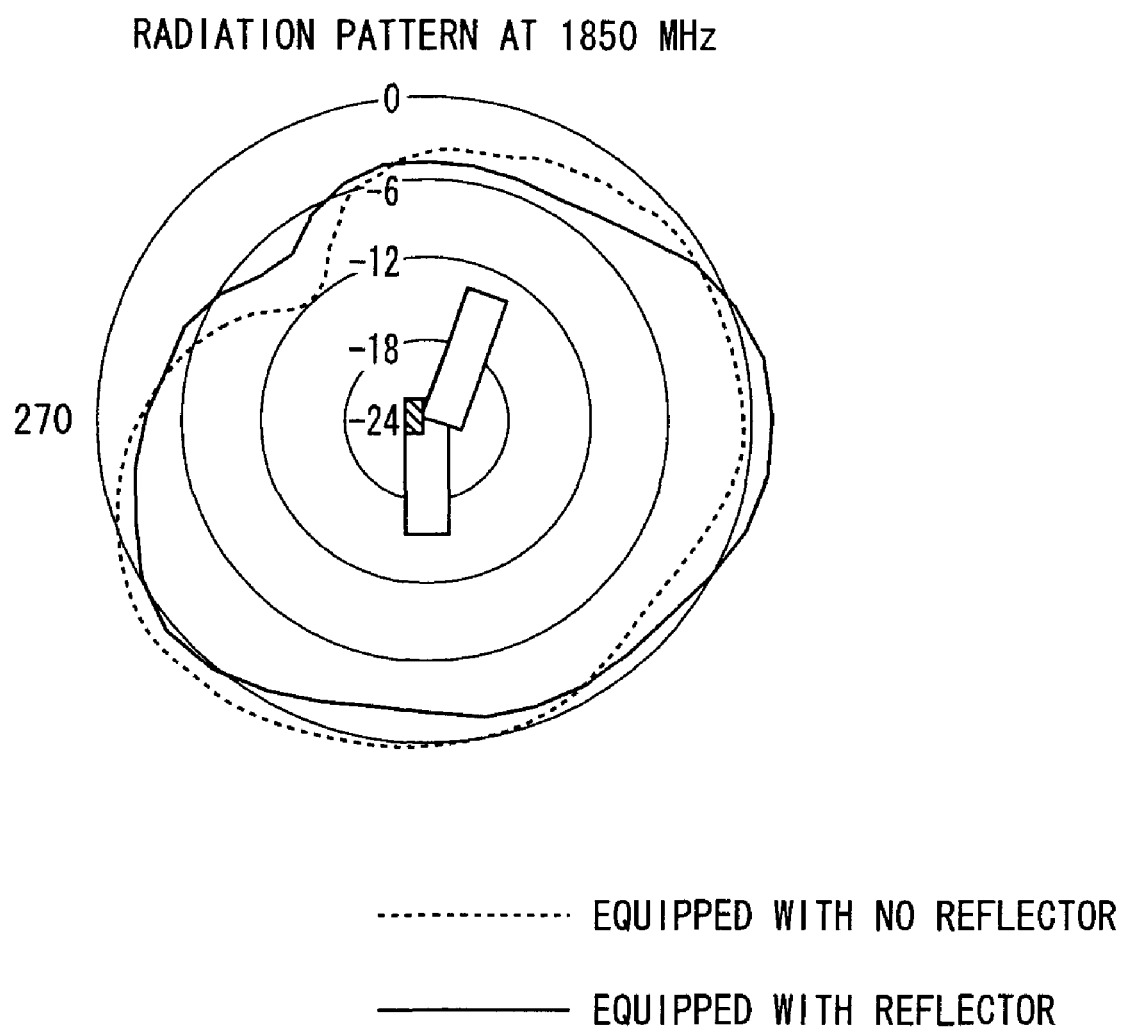
FIG. 5 shows a graph showing a far-field radiation directivity measured for the mobile telephone according to the embodiment of the present invention.

FIG. 5 shows a graph of measured values of a far-field radiation directivity on a plane surface including a side closer to the human body (front side) and a side opposite to the human body (back side) during a call, with regard to the mobile telephone according to the present invention that includes the passive element operating as a reflector and a conventional mobile telephone that does not include a reflector.

The directivity definitely varies. The graph shows a stronger directivity in the descent direction of the housing, with respect to the direction of the human body.

Also, according to the result of measurement of the SAR specified by the Ministry of Internal Affairs and Communications of Japan, FCC of U.S.A., and the like, it is possible to reduce the SAR by 40%.

Modification Example

Although the present invention has been described based on the above embodiment, the present invention is of course not limited to the above embodiment.

Also, the description has been provided in the above embodiment regarding the case the mobile telephone of the present invention is a foldable mobile telephone.

Alternatively, it may be possible to employ a mobile telephone that has an overlap region as described above.

INDUSTRIAL APPLICABILITY

The mobile telephone relating to the present invention improves a gain of an antenna, and reduces the influence of electric waves on the human body, and accordingly is utilizable in a mobile telephone line network having strict restrictions of SAR.

The invention claimed is:

1. A foldable mobile telephone that comprises a first housing and a second housing connected to each other, wherein
the first housing and the second housing have an overlap region that is a region overlapping therebetween in an unfolded state,
within the overlap region, the first housing is more distant from a user's body than the second housing, in a positional relation with the user holding the telephone during a telephone call,
the second housing includes a passive element as a reflector in the overlap region, and
the passive element has substantially a same area as the overlap region, influences on characteristics of electric waves in a relation with the built-in antenna, is a reflector having an electrical length that is approximately half a wavelength relating to a resonant frequency, and is electrically disconnected from a display and all metallic members that are disposed in the second housing.

2. The foldable mobile telephone of claim 1, wherein
the first housing and the second housing are coupled to each other by a hinge, and are rotatable about the hinge, and
the passive element is formed in a vicinity of the hinge.

3. The foldable mobile telephone of claim 2, wherein
the first housing includes an operation unit on a main surface thereof,
the second housing includes a display on a main surface thereof,
the first housing has a projecting part at one end on the main surface in which the built-in antenna is disposed,
the second housing has cylindrical part at one end that is formed so as to be rotatable with respect to the projecting part, and
the passive element is disposed in the overlap region that includes the cylindrical part.

4. The foldable mobile telephone of claim 3, wherein
the passive element is a reflector that is a metal film disposed on an inner surface of a member forming the main surface of the first housing.

5. The foldable mobile telephone of claim 4, wherein
the passive element is the metal film evaporated onto the inner surface.

6. A foldable mobile telephone that comprises a first housing and a second housing connected to each other, wherein
the first housing and the second housing are coupled to each other by a hinge, and are rotatable about the hinge, and
the first housing and the second housing have an overlap region that is a region overlapping therebetween in an unfolded state,
within the overlap region, the first housing is more distant from a user's body than the second housing, in a positional relation with the user holding the telephone during a telephone call,
the first housing includes a built-in antenna in the overlap region,
the second housing includes a passive element as a reflector in the overlap region, and
the passive element influences on characteristics of electric waves in a relation with the built-in antenna, and is formed in a vicinity of the hinge, and
regardless of being in the unfolded state or a folded state, an entire part of the first housing where the built-in antenna is provided overlaps with a part of the second housing where the passive element is provided.

7. The foldable mobile telephone of claim 6, wherein
an antenna used in the foldable mobile telephone for communicating with other mobile telephone is only the built-in antenna included in the first housing.

8. A foldable mobile telephone that comprises a first housing and a second housing connected to each other, wherein
the first housing and the second housing have an overlap region that is a region overlapping therebetween in an unfolded state,
within the overlap region, the first housing is more distant from a user's body than the second housing, in a positional relation with the user holding the telephone during a telephone call,
the first housing includes a built-in antenna in the overlap region,
the second housing includes a passive element as a reflector in the overlap region, and
the passive element is electrically disconnected from a display and all metallic members that are disposed in the second housing.

9. The foldable mobile telephone of claim 8, wherein the passive element influences on characteristics of electric waves in a relation with the built-in antenna.

* * * * *